(12) United States Patent
Bartley

(10) Patent No.: US 7,624,628 B2
(45) Date of Patent: Dec. 1, 2009

(54) MONITORING OF EXHAUST GAS OXIDATION CATALYSTS

(75) Inventor: Gordon J. J. Bartley, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 63 days.

(21) Appl. No.: 11/961,417

(22) Filed: Dec. 20, 2007

(65) Prior Publication Data

US 2009/0158813 A1 Jun. 25, 2009

(51) Int. Cl.
*G01M 15/10* (2006.01)
(52) U.S. Cl. .................................... 73/114.75
(58) Field of Classification Search ............... 73/114.69, 73/114.71, 114.75
See application file for complete search history.

(56) References Cited

U.S. PATENT DOCUMENTS

| | | | |
|---|---|---|---|
| 6,079,203 A | 6/2000 | Wakamoto |
| 6,199,372 B1 | 3/2001 | Wakamoto |
| 6,224,727 B1 | 5/2001 | Miyata et al. |
| 6,300,754 B1 | 10/2001 | Walde |
| 6,352,632 B1 | 3/2002 | Inagaki et al. |
| 6,502,386 B1 | 1/2003 | Mazur et al. |
| 6,615,580 B1 | 9/2003 | Khair et al. |
| 7,155,334 B1 | 12/2006 | Stewart et al. |
| 2004/0040284 A1 | 3/2004 | Upadhyay et al. |
| 2004/0040289 A1 | 3/2004 | Mazur et al. |

FOREIGN PATENT DOCUMENTS

WO 2004020807 A1 3/2004

OTHER PUBLICATIONS

NGK Automotive Ceramics, U.S.A., Inc. "Sensor Technology," available at http://www.ngk-detroit.com/prod_sesortechnology.html (retrieved on Dec. 10, 2007) 2 pages.
"Catalytic Converter," available at http://wikicars.org/en/catalytic_converter (retrieved Dec. 10, 2007) 12 pages.
"Catalytic Converter," available at http://wikipedia.org/wiki/catalytic_converter (retrieved Dec. 14, 2007) 10 pages.
"Selective Catalytic Reduction for Heavy Duty Vehicles to meet Euro 4 and 5 Emission Legislation," Association for Emissions Control by Catalyst, available at http://www.handling-adblue.co.uk/papers/AECC.pdf; 2 pages.
Siemens VDO Trading GmbH, "Smart NOx-Sensor" available at http://www.vdo.de/NR/rdonlyres/9F8EF6E2-2DD5-4CE0-9675-72275775725E/0/svnoxsensordatenblatten.pdf; 2 pages.

*Primary Examiner*—Eric S McCall
(74) *Attorney, Agent, or Firm*—Grossman Tucker et al

(57) ABSTRACT

The present disclosure is directed at a method, system and apparatus that may include an oxidation catalyst, a first sensor positioned upstream of the oxidation catalyst, a second sensor positioned downstream of the oxidation catalyst. The first and second sensors may respond differently to the concentration of NO and $NO_2$. In addition, the first and second sensors may provide signals, which may be received by a processor to determine oxidation catalyst efficiency.

18 Claims, 3 Drawing Sheets

MONITORING OF EXHAUST GAS OXIDATION CATALYSTS

FIELD OF THE INVENTION

The disclosure herein relates to a method, system and/or article for monitoring the performance of an oxidation catalyst which may be used in exhaust treatment applications.

BACKGROUND

An automotive emissions catalyst may be considered an emissions control device which may be incorporated into the exhaust system of a motor vehicle between the exhaust manifold and the muffler. One type of catalyst, known as an oxidation catalyst, may contain one or more chemical components, such as those based on platinum, palladium, or rhodium, which assist in reducing the levels of hydrocarbons (HC), and carbon monoxide (CO) in the exhaust gas. This may then reduce the amount of these pollutants which would otherwise be emitted into the atmosphere. In one example of an oxidation catalyst, HC and CO in the exhaust are oxidized to form carbon dioxide ($CO_2$) and water.

However, over time, the catalyst may decrease in efficiency. For example, a number of components may be introduced into the automotive internal combustion engine exhaust that may act as a poison to the oxidation catalyst. High temperatures may also deactivate the catalyst. In addition, the catalyst may be rendered inefficient due to the presence of solid (particulate) matter. Accordingly, it is desirable to monitor the performance of the catalyst and notify an operator when a particular level of inefficiency or failure occurs. On Board Diagnostics (OBD) regulations require such catalyst monitoring.

SUMMARY OF THE INVENTION

An aspect of the present disclosure relates to a method of monitoring oxidation catalyst efficiency with respect to an engine exhaust gas. The method may include receiving a first signal from a first sensor upstream of an oxidation catalyst and a second signal from a second sensor downstream of the oxidation catalyst, wherein the sensors respond differently to the concentrations of NO and $NO_2$. The method may also include monitoring a difference in the signals as between the first and second sensors and determining the efficiency of the oxidation catalyst to oxidize an exhaust gas based upon the difference in the signals as between the first and second sensors.

Another aspect of the present disclosure relates to a system for measuring the efficiency of an oxidation catalyst. The system may include an oxidation catalyst, a first sensor positioned upstream of the oxidation catalyst, a second sensor positioned downstream of the oxidation catalyst, wherein the first and second sensors are configured to respond differently to the concentrations of NO and $NO_2$. In addition, the first and second sensors are configured to provide a signal and a processor may be included configured to receive the signals provided by the first and second sensors. The processor may then determine the efficiency of the oxidation catalyst based upon the signals provided by the first and second sensors.

A further aspect of the present invention relates to an article comprising a storage medium having stored thereon instructions that when executed by a machine results in receiving a first signal from a first sensor upstream of an oxidation catalyst and a second signal from a second sensor downstream of the oxidation catalyst, wherein the sensors respond differently to the concentration of NO and $NO_2$. In addition, the instructions may result in monitoring a difference in the signals as between the first and second sensors. Based upon such difference, the processor may determine the efficiency of the oxidation catalyst to oxidize an exhaust gas.

BRIEF DESCRIPTION OF THE DRAWINGS

The above-mentioned and other features of this disclosure, and the manner of attaining them, will become better understood by reference to the following description of embodiments described herein taken in conjunction with the accompanying drawings, wherein.

DETAILED DESCRIPTION

Disclosed herein is a system and method for the measurement of exhaust gas emissions, and in particular, NOx emissions, in a diesel exhaust system which may then be used to determine the efficiency of oxidation catalyst. The oxidation catalyst may also include what is identified as a non-methane hydrocarbon catalyst (NMHC) and/or a diesel oxidation catalyst (DOC). The oxidation catalyst may include one or more catalysts or elemental components, such as those based on platinum, palladium or rhodium. The measurement data regarding NOx emissions may then be utilized in an On-Board Diagnostics (OBD) system to determine whether the oxidation catalyst has a reduced efficiency or no longer is oxidizing combustion gases at a desired level of conversion.

Efficiency of an oxidation catalyst herein refers to the ability of the catalyst to oxidize a given exhaust component in the presence of oxygen. For example, efficiency may be related to the ability of the catalyst to convert carbon monoxide (CO) to carbon dioxide ($CO_2$) or the conversion of hydrocarbons (HC) to carbon dioxide and water. In addition, the oxidation catalyst herein may be monitored to detect the inability of the catalyst to oxidize a given exhaust component or perform sufficiently to meet a given level of oxidation and/or yield of oxidized products, such as those provided in a set of standards, including those standards set by various government agencies or manufacturers.

Figure 1:
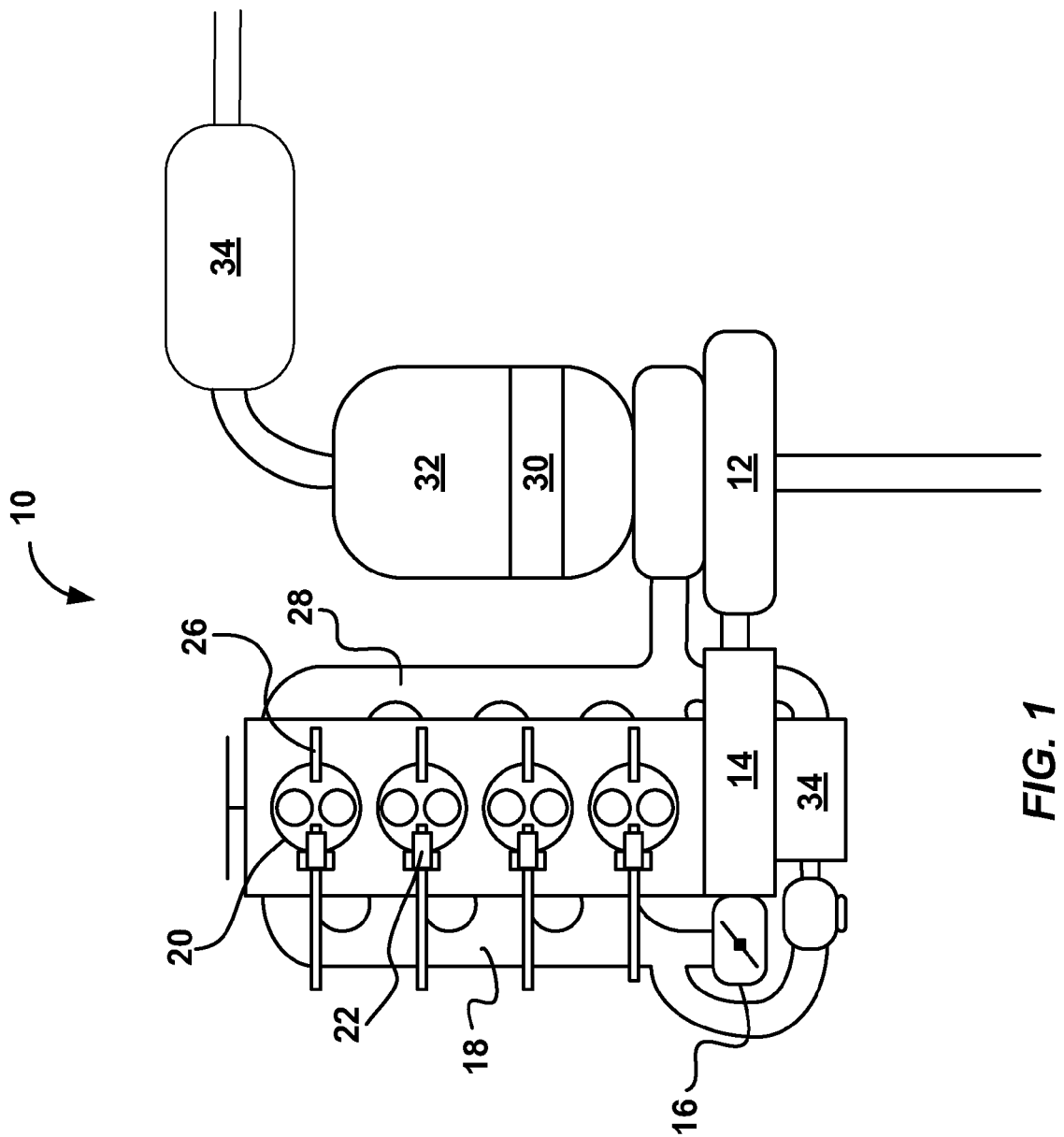
FIG. 1 is a schematic drawing of an example of a diesel engine and exhaust emissions system.

An example of a diesel engine contemplated herein is illustrated in FIG. 1. Air may enter the diesel engine 10 and may be pressurized in a turbocharger 12. The air may then pass through an intercooler 14 and possibly through an intake throttle valve 16, which may be utilized to adjust the amount of air that enters the engine 10. The induced air may then pass through the intake manifold 18, which may deliver air to the individual cylinders 20. Fuel may also be introduced to the individual cylinders via a fuel injector 22 positioned within each cylinder. A glow plug 26 may also be positioned within the cylinders 20 or cylinder heads.

Once combusted, exhaust gas may exit through the exhaust manifold 28 and pass through the remainder of the exhaust system and/or be re-circulated through the engine, otherwise known as exhaust gas recirculation. The exhaust gas may include a number of pollutants, such as unburned hydrocarbons (HC), carbon monoxide (CO) and nitrogen oxides (NOx), such as nitric oxide (NO) and nitrogen dioxide ($NO_2$).

When the exhaust gas exits through the remainder of the exhaust system, the exhaust gas may be treated by a number of components, such as an oxidation catalyst 30, a diesel particulate filter 32 and/or a NOx trap or selective catalytic reduction treatment 34. In particular, the oxidation catalysts may assist in the conversion of hydrocarbons (HC) to carbon dioxide ($CO_2$) and water ($H_2O$), carbon monoxide (CO) to carbon dioxide ($CO_2$) and nitric oxide (NO) to nitrogen dioxide ($NO_2$) as is illustrated in the reaction equations below.

$$2C_xH_y + (2x+y/2)O_2 \rightarrow 2xCO_2 + yH_2O$$

$$2CO + O_2 \rightarrow 2CO_2$$

$$2NO + O_2 \rightarrow 2NO_2$$

As may be appreciated, the ability of the oxidation catalyst to convert and/or oxidize one compound may correlate to the ability of the oxidation catalyst to convert and/or oxidize another compound. For example, the ability of the catalyst to convert hydrocarbons to carbon dioxide and water may be related to the ability of the oxidation catalyst to convert the nitric oxide NO to nitrogen dioxide NO2. However, it may be appreciated that the oxidation of some compounds (for example, NO) may be more sensitive to a decrease in efficiency of the oxidation catalyst than the oxidation of other compounds (for example, hydrocarbons or carbon monoxide) or vice versa.

Figure 2:
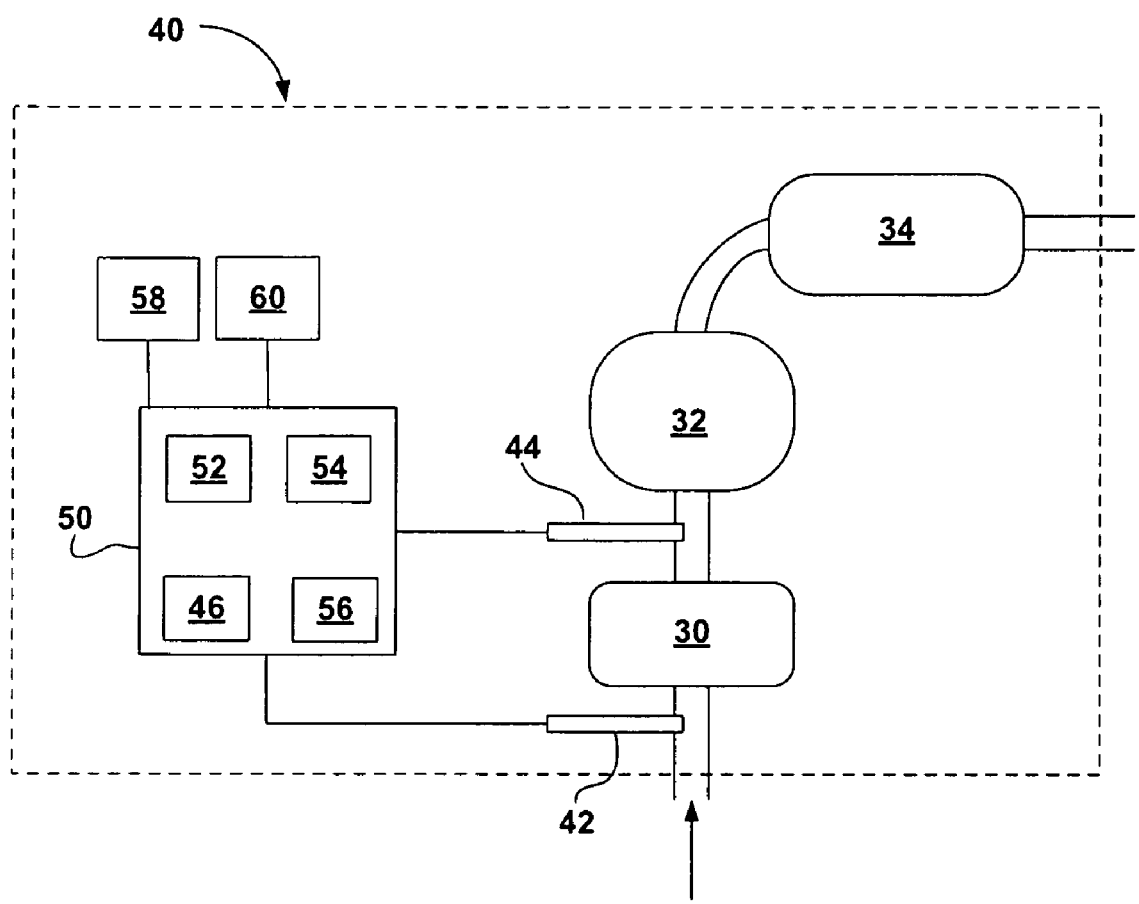
FIG. 2 is a schematic of an example of a system for monitoring catalyst degradation.

Illustrated in FIG. 2 is an example of a system for monitoring the degradation of the oxidation catalyst. The system 40 may include at least two sensors. A first sensor 42 may be positioned upstream from the oxidation catalyst 30, prior to the exhaust passing through the oxidation catalyst and a second sensor 44 may be positioned downstream of the oxidation catalyst 30, after the exhaust passes through the catalyst 30. It may be appreciated that more than one sensor may be provided either upstream or downstream from the oxidation catalyst. In addition, the sensors need not be positioned directly upstream or downstream from the oxidation catalyst. For example, the second sensor 44 may be positioned directly downstream of the oxidation catalyst 30 or downstream of the diesel particulate filter 32.

Figure 3A:
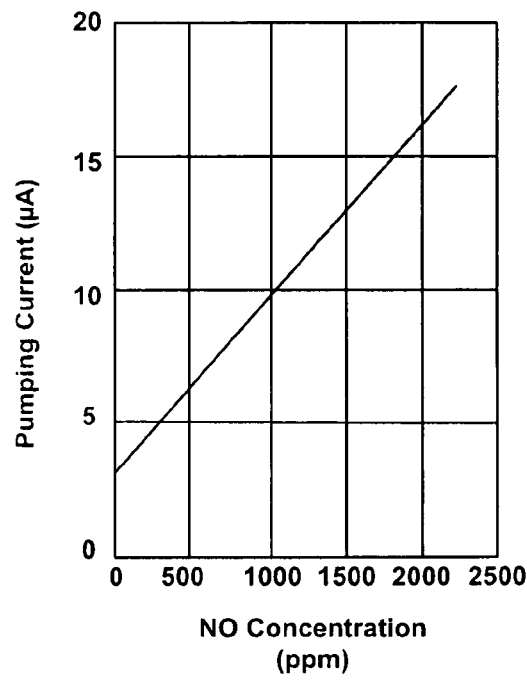
FIGS. 3a and 3b are plots illustrating the responsiveness of a NOx sensor to NO and $NO_2$.
Figure 3B:
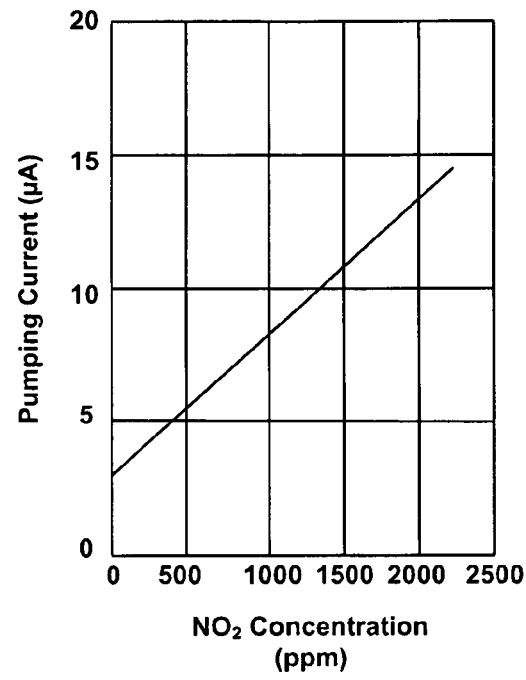

In an example, the sensors may include any sensors that are responsive to NOx, including NO and $NO_2$. In particular, one sensor that is contemplated herein is the Smart NOx Sensor available from NGK Ceramics, Inc., Mooresville, N.C. In addition, the sensors 42, 44 may respond differently to NO than to $NO_2$. FIGS. 3a and 3b illustrate an example of the difference between the responsiveness of the NOx sensor to NO and $NO_2$. More specifically, FIG. 3a illustrates a plot of NO concentration (ppm) to pumping current ($\mu A$), whereas FIG. 3b illustrates a plot of $NO_2$ concentration (ppm) to pumping current ($\mu A$). As can be seen from these figures, the sensor may be more responsive to changes in NO concentration than to changes in $NO_2$ concentration (e.g. the slope of the pumping current, relative to the concentration is relatively greater in FIG. 3a as compared to FIG. 3b). More specifically, in the example presented by these figures, the pumping current for NO over the range of 1-2250 ppm varies between 3.1 $\mu A$ and 17.6 $\mu A$ and the pumping current for $NO_2$ over the range of 1-2250 ppm varies between 3.0 $\mu A$ and 14.5 $\mu A$. Reference is made to U.S. Pat. No. 6,224,727 for a discussion of NOx sensors that utilize pumping current to measure NOx concentration, whose teachings are incorporated by reference.

Therefore it may be appreciated that the sensor may have a difference in response (output signal such as pumping current) of 1 to 80% over the concentration range of NO or $NO_2$ between 1 to 2250 ppm, including all values and ranges therein. For example, with attention to the example of FIG. 3a, at about 2000 ppm NO the output current is about 16.15 $\mu A$ and with attention to the example of FIG. 3b, at about 2000 ppm $NO_2$ the output current is about 13.33 $\mu A$. Accordingly, at 2000 ppm, the difference in response is about 17.5% (wherein the difference is calculated as follows: [(16.15−13.33)/16.15]×100%).

In operation, as the oxidation catalyst converts a portion of the NO to $NO_2$, a decrease in the sensor output may occur, as the sensor may not be as responsive to the $NO_2$ relative to NO. Accordingly, as exhaust gas is passing through the exhaust system, the first sensor 42 may detect a given amount of NOx, including both NO and $NO_2$ components. The catalyst may then convert a portion of the NO to $NO_2$. For example, the catalyst may convert up to 60% by volume of the NO to $NO_2$. After the gas leaves the oxidation catalyst and passes the second sensor, the second sensor 44 may also detect a given amount of NOx, including both NO and $NO_2$ components. However, as the sensor may have different sensitivities to the NO and $NO_2$ components, and while the oxidation catalyst is still performing, the second sensor 44 should indicate a relatively different (e.g. lower) output signal than the first sensor.

It can be appreciated that with respect to a processor monitoring the output signal of sensors 42 and 44, such processor, in the presence of a functioning oxidation catalyst, may report that the level of NOx has been reduced, when in fact the overall amount of NOx has simply altered as between the NO and $NO_2$ content. The disclosure herein has therefore recognized the advantage to such reporting error and the ability to exploit such error to monitor oxidation catalyst efficiency. In other words, as the oxidation catalyst degrades, less NO may be converted to $NO_2$ and a smaller difference in NOx concentration between the first sensor 42 and second sensor 44 may be detected. When no difference is detected, it signals that the oxidation catalyst may be completely deactivated. It might be appreciated that a sensor providing a different or opposite response to NO and $NO_2$ is contemplated herein as well (i.e. a sensor that is relatively more sensitive to $NO_2$ relative to NO).

Referring back to FIG. 2, the sensors may be in communication with an on-board diagnostics system (OBD) 46. The on-board diagnostics system 46 may be included in an electronic control unit 50 (as illustrated) or may be separate from the electronic control unit 50. The ECU may include a central processing unit 52, memory 54 including random access memory, read only memory and/or non-volatile random access memory, and a look up table 56, which may be included in the ROM. The on-board diagnostics system 46 may be configured to monitor exhaust-gas related electrical components and/or system functionality and store faults in an electronic control unit (ECU) 50. An indicator 58 may be provided and activated to alert an operator during operation of the engine of any problems or faults with the oxidation catalyst, for example, when the NOx levels fall outside of given limits. Furthermore, a connector port 60 may be provided for an operator to retrieve faults, diagnosis codes, or other information stored in the electronic control unit memory.

If the differences in signals provided from upstream versus downstream of the oxidation catalyst indicate that the catalyst may be degrading, the OBD 46 may send a fault signal to the ECU 50, which may store the fault in memory to be later retrieved by an operator. The OBD 46 may also send a signal to the operator, such as lighting a malfunction indicator lamp 58 located in the dashboard. It may be appreciated that the on-board diagnostics system may monitor the oxidation catalyst efficiency periodically, at given engine conditions or time intervals, or the on-board diagnostics system may monitor the oxidation catalyst efficiency on a continuous basis.

As alluded to above, the system may be calibrated, wherein given differences in signals between the first and second sensors may indicate certain efficiencies of the oxidation catalyst. For example, the calibration may be performed by determining the change in NOx levels in the exhaust stream before and after the catalyst when the catalyst is at known points of efficiency. The data correlating signal to efficiency may then be stored in a look up table, such as look up table 56. It may be appreciated that the data may also be stored in terms of voltage rather than current. In addition, conversions between current, voltage or NOx concentration may be calculated prior to or after referencing the look up tables.

Furthermore, additional data may be provided in the same or different look up tables that include given standards for the type of engine and for the applications in which the engine may be employed. For example, a single engine may be utilized across a number of platforms, such as locomotive, boat and/or heavy truck and the standards for each of the platforms may vary. Accordingly, the on-board diagnostics may be separately programmable or provided with hardware or firmware which correlates to the engine and desired application for the engine. In practice, once the efficiency has been determined, the standards may be referenced to determine if the efficiency is within a given allowable range for the specific application.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of monitoring oxidation catalyst efficiency with respect to an engine exhaust gas, comprising:
    receiving by a processor a first signal from a first sensor upstream of an oxidation catalyst and a second signal from a second sensor downstream of said oxidation catalyst, wherein said sensors respond differently to the concentration of NO and $NO_2$, wherein the first and second signals comprise a pumping current and the pumping current for NO over the range of 1-2250 ppm varies between 3.1 µA and 17.6 µA and the pumping current for $NO_2$ over the range of 1-2250 ppm varies between 3.0 µA and 14.5 µA;
    monitoring a difference in said signals as between said first and second sensors; and
    determining the efficiency of said oxidation catalyst to oxidize an exhaust gas based upon said difference in said signals as between said first and second sensors.

2. The method of claim 1 wherein said first and second sensors are more responsive to the concentration of NO versus $NO_2$.

3. The method of claim 1 wherein said first and second sensors provide an output signal in response to NO that is greater than the output signal response to $NO_2$ at a given concentration.

4. The method of claim 3 wherein said output signal to NO is 1-80% greater than the output signal for $NO_2$ at a given concentration.

5. The method of claim 3 wherein the slope of the output signal versus concentration for NO is different than the slope of the output signal versus concentration for $NO_2$.

6. The method of claim 1, wherein said sensors are monitored periodically.

7. The method of claim 1, wherein said sensors are monitored continuously.

8. The method of claim 1, further comprising comparing said differences in said signals received by said first and second sensors to a look up table.

9. The method of claim 1, further comprising providing an indicator wherein said indicator identifies when said efficiency of said oxidation catalyst to oxidize exhaust gases is below a selected level.

10. The method of claim 1, further comprising storing a fault code in an electronic control unit when said efficiency of said oxidation catalyst to oxidize exhaust gases is below a selected level.

11. A system for measuring the efficiency of an oxidation catalyst comprising:
    an oxidation catalyst;
    a first sensor positioned upstream of said oxidation catalyst;
    a second sensor positioned downstream of said oxidation catalyst, wherein said first and second sensors are configured to respond to the concentration of NO and $NO_2$ differently and wherein said first and second sensors are configured to provide a signal, wherein the first and second signals comprise a pumping current and the pumping current for NO over the range of 1-2250 ppm is configured to vary between 3.1 µA and 17.6 µA and the pumping in current for $NO_2$ over the range of 1-2250 ppm is configured to vary between 3.0 µA and 14.5 µA;
    a processor configured to receive said signals provided by said first and second sensors and determine the efficiency of said oxidation catalyst based upon said signals provided by said first and second sensors.

12. The system of claim 11, wherein said first and second sensors are configured to be more responsive to the concentration of NO versus $NO_2$.

13. The system of claim 11, wherein said first and second sensors are configured to provide an output signal in response to NO that is greater than the output signal response to $NO_2$ at a given concentration.

14. The system of claim 13, wherein said output signal to NO is configured to be 1-80% greater than the output signal for $NO_2$ at a given concentration over a range of 1-2250 ppm NO and/or $NO_2$.

15. The system of claim 13, wherein the slope of the output signal versus concentration for NO is different than the slope of the output signal versus concentration for $NO_2$.

16. The system of claim 11, further comprising an indicator, wherein said processor is configured to activate said indicator if said efficiency falls below a given level.

17. The system of claim 11, further comprising a look up table, wherein said processor is configured to reference said look up table.

18. An article comprising a storage medium having stored thereon instruction that when executed by a machine result in the following operations:
    receiving by a processor a first signal from a first sensor upstream of an oxidation catalyst and a second signal from a second sensor downstream of said oxidation catalyst, wherein said sensors respond differently to the concentration of NO and $NO_2$, wherein the first and second signals comprise a pumping current and the pumping current for NO over the range of 1-2250 ppm is configured to vary between 3.1 µA and 17.6 µA and the pumping current for $NO_2$ over the range of 1-2250 ppm is configured to vary between 3.0 µA and 14.5 µA;
    monitoring a difference in said signals as between said first and second sensors; and
    determining the efficiency of said oxidation catalyst to oxidize an exhaust gas based upon said difference in said signals as between said first and second sensors.

* * * * *